United States Patent [19]

Nishikubo

[11] Patent Number: 5,623,023
[45] Date of Patent: Apr. 22, 1997

[54] CURABLE COMPOSITIONS WHICH RELEASE IMIDAZOLE UPON IRRADIATION

[75] Inventor: Tadatomi Nishikubo, Fujisawa, Japan

[73] Assignee: Taiyo Ink Manufacuturing Co., Ltd., Japan

[21] Appl. No.: 650,981

[22] Filed: May 21, 1996

[30] Foreign Application Priority Data

May 23, 1995 [JP] Japan .................... 7-146889

[51] Int. Cl.⁶ ............................ C08G 59/44; C08G 59/54
[52] U.S. Cl. .............. 525/327.3; 525/481; 525/484; 525/504; 528/91; 528/94; 528/327; 528/341; 528/361; 528/365; 528/367; 528/407; 522/63; 522/100; 522/170
[58] Field of Search ........................ 528/94, 91, 327, 528/341, 365, 361, 407, 367; 525/327.3, 481, 504, 484

[56] References Cited

U.S. PATENT DOCUMENTS 4,436,892  3/1984  Zondler et al. ............... 528/117

OTHER PUBLICATIONS

Polymer Journal, vol. 26, No. 7, pp. 864–867, "Photogeneration of Polyfunctional Thiol and Thermal Curing Reaction of Epoxy Resins Using the Thiol" Feb. 1994.

Polymer Journal, vol. 25, No. 4, pp. 421–425, "Novel Thermal Curing Reactions of Epoxy Resin and Polyurethane Oligomers Using Photogenerated Polyfunctional Amines" Oct. 1993.

Nishikubo, Tadatomi, et al., "Photogeneration of Polyfunctional Amines and Novel Thermal Curing Reactions of Epoxy Resin and Polyurethane Oligomer Using These Amines", Journal of Polymer Science: Part A: Polymer Chemistry, vol. 31, 3013–3020 (1993).

*Primary Examiner*—Frederick Krass
*Attorney, Agent, or Firm*—Ronald P. Kananen

[57] ABSTRACT

Disclosed is a curable composition comprising (A) an imidazole derivative represented by the following general formula (1), which is capable of generating free imidazole by exposure to light, and (B) a polyfunctional epoxy compound:

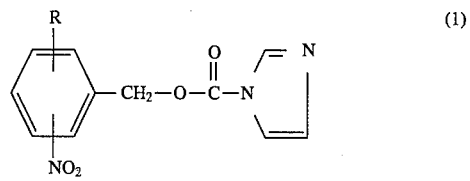

wherein R represents a hydrogen atom, a halogen atom, an alkyl group, an aryl group, an aralkyl group, a nitro group, a cyano group, an alkoxyl group, a phenoxy group, or an aromatic ring residue capable of forming a condensed ring in combination with a benzene ring. The composition may further incorporate therein at least one compound selected from the group consisting of polyfunctional phenol compounds, polyfunctional carboxylic acids, acid anhydrides, and amine compounds.

18 Claims, 1 Drawing Sheet

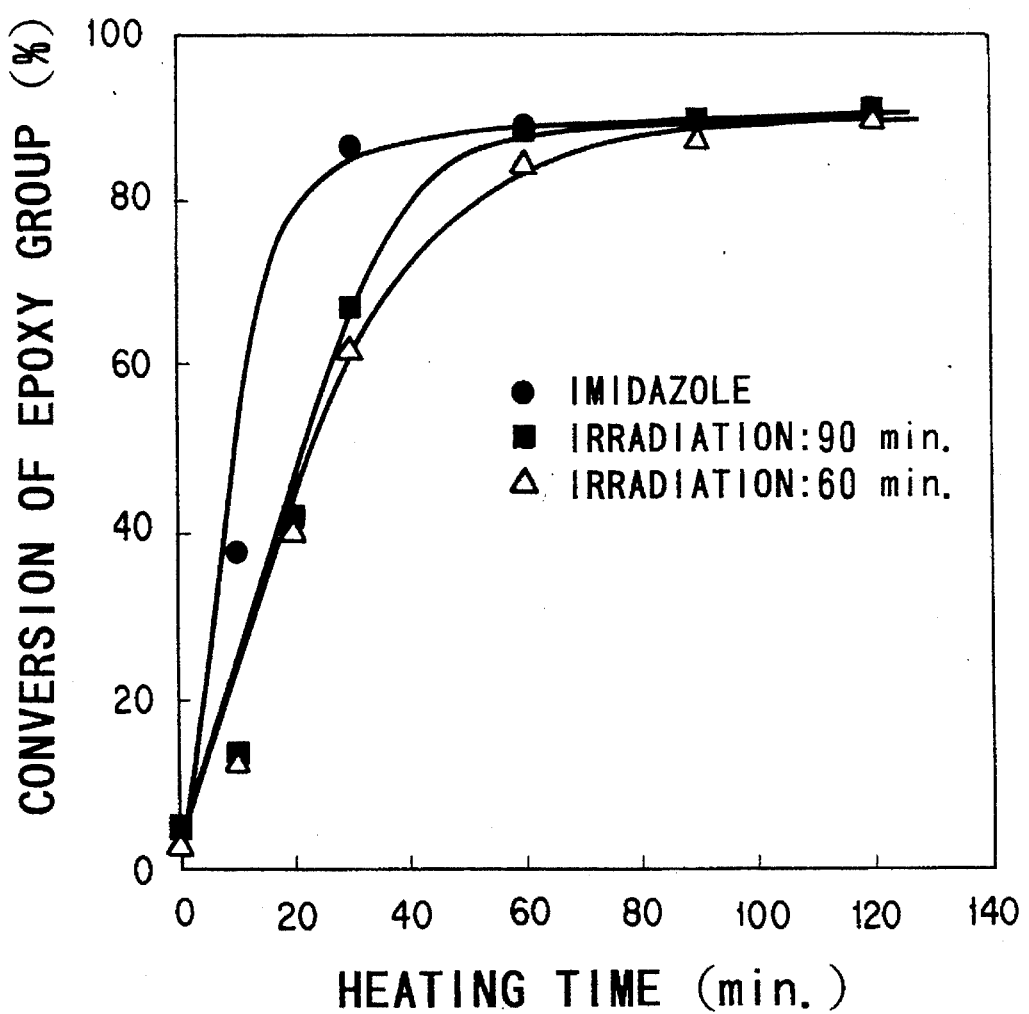

CURABLE COMPOSITIONS WHICH RELEASE IMIDAZOLE UPON IRRADIATION

BACKGROUND OF THE INVENTION

1. Field of the Invention

This invention relates to a curable composition and more particularly to an epoxy resin-based curable composition which is cured by exposure to light and heat.

2. Description of the Prior Art

Various photocurable compositions have heretofore found extensive utility in various applications such as printing plates, coating materials, printing inks, etching resists, plating resists, solder resists, surface covering materials, varnishes, adhesive agents, and potting materials. Most of them are compositions which basically comprise a radically polymerizable polyfunctional (meth)acrylic ester and a radical photopolymerization initiator. This reaction system is characterized by exhibiting an excellent photocuring properties and offering great versatility in the combination of (meth)acrylic esters which can be used therefor. Since the curable compositions containing (meth)acrylic esters undergo marked voluminal shrinkage while being cured by the agency of light, however, the cured products thereof are generally deficient in substrate adhesiveness and in dimensional stability. In theory of reaction, the radical photopolymerization system has the problem that the cured product exhibits poor surface curing properties because the polymerization is inhibited by oxygen. Many polyfunctional (meth)acrylic esters give a strong effect on human skin and, in this respect, incur a problem of difficult handling.

Photocurable compositions produced from polyfunctional vinyl ethers or epoxy compounds by using such cationic photopolymerization initiators as diphenyl iodonium hexafluoroantimonate and triphenyl sulfonium tetrafluorophosphate have been also known. These photocurable compositions are characterized by undergoing small voluminal shrinkage during the course of curing, escaping the action of oxygen tending to inhibit polymerization, and having only a low stimulus to the human skin as compared with the acrylic ester-containing photocurable compositions, and, therefore constitute important chemically amplifying photoresists possessed of high sensitivity and high resolution. When such compounds as diphenyl iodonium hexafluoroantimonate and triphenyl sulfonium tetrafluorophosphate are used for the photocuring reaction of a polyfunctional vinyl ether or epoxy compound, a strongly acidic compound inevitably persists in the cured product because the cationic polymerization initiator, which is formed by exposure to light, is a strong acid. When these compositions are used as adhesive agents, solder resists, coating materials, and covering materials, therefore, the corrosion of a substrate by the acid poses a serious problem. Further, the cationic photopolymerization system, though not susceptible to the action of oxygen tending to inhibit reaction, has the reaction thereof seriously inhibited by water and the hydroxyl group of the reaction system. As a result, the photocuring system of this nature requires removal of impurities, selection of a functional group, and extremely high purity and, from the technical point of view, poses a problem of difficult handling.

Epoxy resin-based compositions have been known as thermosetting compositions which are capable of precluding corrosion of a substrate by a strongly acidic compound produced by exposure to light as described above and are not subject to the action of oxygen tending to inhibit a reaction. Since the epoxy resins cured by the use of various amine type curing agents, for example, excel in mechanical strength, dimensional stability, adhesive strength, and resistance to chemicals, the epoxy resin-based curable compositions have been finding extensive utility in a wide variety of applications such as adhesive agents, potting materials, printed circuit boards, composite materials, coating materials, and printing inks. These curable compositions react relatively rapidly and this reaction proceeds while the compositions are being handled. Various technical studies, therefore, have been pursued and due improvements proposed with respect to the micro-capsulation of the curing agent and the control of the stubborn reaction. The epoxy resin-based compositions nevertheless exhibit many problems which have yet to be solved or improved an in terms of storage stability and reaction control.

Imidazole compounds are heterocyclic compounds containing a secondary amino group and a tertiary amino group. They are usable by themselves as a crosslinking agent for epoxy resins. Because of their excellent catalytic activity, however, they prove highly useful in most cases as a catalyst for the ring opening polymerization of an epoxy group and as a catalyst for the addition reaction of an epoxy group to carboxylic acids, phenols, alcohols, amines, or activated esters. Thus, they have been finding extensive utility in a wide range of industrial applications. When imidazoles are added to epoxy resins (epoxy compounds) or to the mixtures of epoxy resins with such crosslinking and curing agents as polyfunctional carboxylic acids, phenols, alcohols, and amines, however, they go to accelerate the reaction and consequently impair the storage stability.

SUMMARY OF THE INVENTION

It is an object of the present invention, therefore, to eliminate the problems induced by the use of an imidazole compound as a catalyst as described above, and provide a one-pack type epoxy resin-based curable composition which uses an imidazole derivative having a blocked amino group, which allows the derivative to liberate imidazole through a photochemical reaction, and which excels in storage stability and curing characteristics.

To accomplish the object mentioned above, the present invention provides a curable composition comprising (A) an imidazole derivative represented by the following general formula (1), which is capable of generating free imidazole by exposure to light, and (B) a polyfunctional epoxy compound:

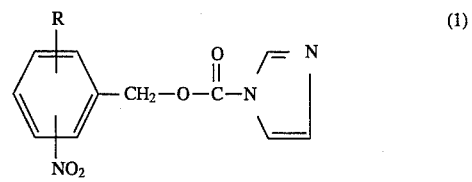

(1)

wherein R represents a hydrogen atom, a halogen atom, an alkyl group, an aryl group, an aralkyl group, a nitro group, a cyano group, an alkoxyl group, a phenoxy group, or an aromatic ring residue capable of forming a condensed ring in combination with a benzene ring.

The present invention further provides a curable composition which comprises at least one compound selected from the group consisting of polyfunctional phenol compounds, polyfunctional carboxylic acids, acid anhydrides, and amine compounds besides the imidazole derivative represented by the general formula (1) mentioned above and the polyfunctional epoxy compound.

BRIEF DESCRIPTION OF THE DRAWING

The attached drawing is a graph showing the relation between the heating time of composition and the degree of conversion of epoxy group obtained of the compositions produced in Example 2 and Comparative Example 1.

DETAILED DESCRIPTION OF THE INVENTION

The epoxy resin-based curable composition according to the present invention is characterized by using as a catalyst for a curing reaction an imidazole derivative which has the amino group of imidazole thereof in a blocked state as described above.

The imidazole as a simple compound contains a secondary amino group containing an active hydrogen and functions as a catalyst for the ring opening polymerization of an epoxy group and for the addition reaction of an epoxy group to carboxylic acids, etc. as described above. When the imidazole is present in such a curing reaction system, the reaction gradually proceeds even at normal room temperature and the composition is ultimately gelled.

The curable composition of the present invention is such as to have excellent storage stability through the use of an imidazole derivative which is so stable that it avoids functioning as a catalyst for the reactions mentioned above unless it is exposed to light and which, only after exposure to light, is enabled to liberate imidazole through a photochemical reaction.

The imidazole derivative to be used in the present invention will be described below with respect specifically to N-(2-nitrobenzyloxy)carbonyl imidazole as a typical example. This compound is stable because it has the amino group thereof kept in a blocked state. It is never allowed to function as a catalyst for the reactions mentioned above unless it is exposed to light. The epoxy resin-based curable composition which contains such an imidazole derivative as described above, therefore, retains excellent storage stability so long as it is stored in a dark place and kept from exposure to light. The composition, when exposed to light, induces photolysis and generates imidazole, as indicated in the following reaction formula (2). When the curable composition of the present invention is subsequently heated, therefore, the imidazole formed by the aforementioned reaction manifests an excellent catalytic action and helps to give rise to a cured product having excellent curing characteristics.

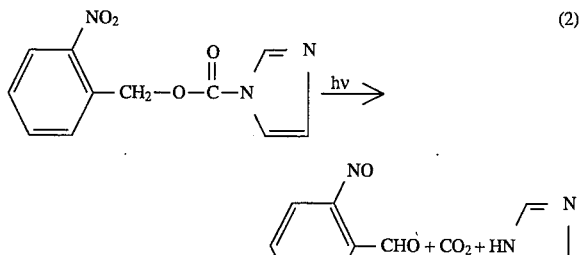

(2)

Besides the N-(2-nitrobenzyloxy)carbonyl imidazole mentioned above, the present invention permits use of all the imidazole derivatives which are so arranged or "constructed" to induce the redox reaction between the methylene group and the nitro group in the nitrobenzyl group of the nitrobenzyloxy carbonyl residue which is blocking the secondary amino group of imidazole and the removal of carbon dioxide as clearly implied by the reaction formula mentioned above. The imidazole derivatives indicated in (a) through (1) below are typical examples:

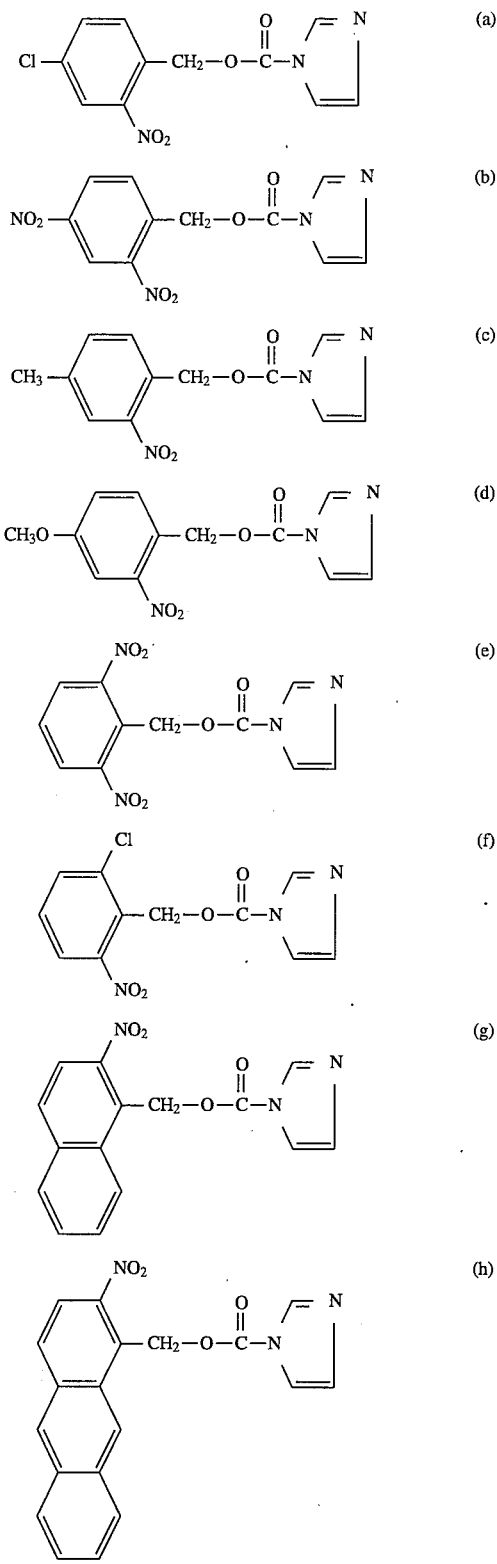

-continued

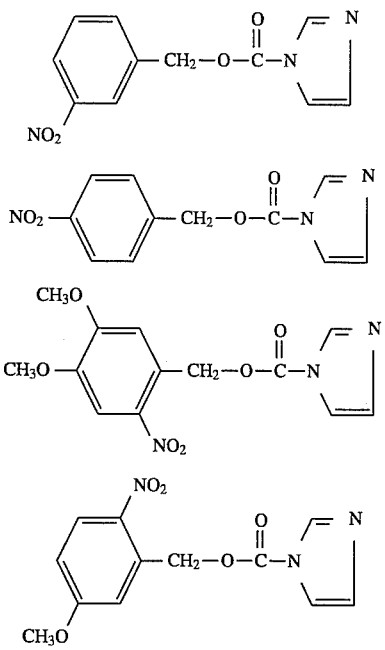

In the imidazole derivatives shown above, the imidazole derivatives of (i) and (j), which have a nitro group respectively at the meta and the para position, are slightly inferior to the other imidazole derivatives in terms of photochemical reactivity but can be expected to be as effective. Imidazole derivatives having a long conjugated system such as, for example, the imidazole derivatives of (g) and (h) which have a condensed ring exhibit an advantageous expansion of the selection of the sources of light of irradiation, because the wavelength ranges for inducing a photochemical reaction expand toward the visible light range.

Typical examples of the epoxy compounds to be used as a main ingredient in the curable resin composition of the present invention include, but are not limited to: glycidyl ether type epoxy resins such as the bisphenol A type epoxy resin obtained by the reaction of bisphenol A with epichlorohydrin in the presence of an alkali, the epoxide of a resin resulting from the condensation of bisphenol A with formalin, and the equivalent using brominated bisphenol A in the place of bisphenol A; novolak type epoxy resins such as the phenol novolak type, orthocresol novolak type, and p-t-butyl phenol novolak type epoxy resins which are obtained by glycidyl-etherifying the corresponding novolak resins with epichlorohydrin; bisphenol F type and bisphenol S type epoxy resins obtained by the reaction of epichlorohydrin with bisphenol F and bisphenol S; alicyclic epoxy resins possessing a cyclohexene oxide group, a tricyclodecene oxide group, or a cyclopentene oxide group; glycidyl ester resins such as phthalic diglycidyl ester, tetrahydrophthalic diglycidyl ester, hexahydrophthalic diglycidyl ester, terephthalic diglycidyl ester, diglycidyl-p-oxybenzoic acid, and dimeric acid glycidyl ester; glycidyl amine type resins such as tetraglycidyl diaminodiphenyl methane, triglycidyl-p-aminophenol, diglycidyl aniline, diglycidyl toluidine, tetraglycidyl methaxylylene diamine, diglycidyl tribromoaniline, and tetraglycidyl bis-aminomethyl cyclohexane; hydantoin type epoxy resins having glycidyl groups linked to their hydantoin rings; triglycidyl (or tris(2,3-epoxypropyl))isocyanurates possessing a triazine ring; bixylenol type or biphenol type epoxy resins; and copolymers having glycidyl groups in their side chains. The epoxy compounds mentioned above may be used either singly or in the form of a combination of two or more members.

The curable composition of the present invention is obtained by combining an imidazole derivative represented by the general formula (1) mentioned above and an epoxy compound as enumerated above in suitable amounts. Specifically, the imidazole derivative is used in an amount in the range of 0.1 to 30 mol %, preferably 1 to 10 mol %, and more preferably 3 to 5 mol %, per mol of the epoxy group in the epoxy compound.

The composition can be prepared by simply mixing the imidazole derivative with the epoxy compound, depending on the state of aggregation (solid or liquid) of the epoxy compound to be used. This mixture, when necessary, may be carried out in a suitable solvent such as, for example, dimethyl formamide, tetrahydrofuran, methylethyl ketone, or ethyl acetate.

The composition thus prepared is spread on a substrate and the applied layer of the composition is cured by exposure to light and heat. The light source for irradiating the composition for the liberation of imidazole from the imidazole derivative may be any of commercially available light sources such as, for example, a low pressure mercury vapor lamp, a high pressure mercury vapor lamp, a xenon lamp, and a metal halide lamp or any of well-known active lights such as, for example, laser beam, electron beam, and X-ray. The duration of the irradiation which is variable with such factors as the intensity of light from the light source is about five minutes at least and about three hours at most. Generally, it falls in the approximate range of 30 to 60 minutes.

By the irradiation of the light which is effected as described above, the imidazole is liberated from the imidazole derivative as indicated by the reaction formula given above and is allowed to function as a catalyst for the ring opening polymerization of the epoxy group of the epoxy compound incorporated in the composition.

When the curable composition, after the irradiation of the light, is heated at a temperature in the approximate range of 80° to 200° C., preferably about 100° to 160° C., it is quickly and smoothly cured thermally and enables the production of a cured product which exhibits excellent characteristics.

In another embodiment of the present invention, the curable composition comprises a polyfunctional phenol compound, a polyfunctional carboxylic acid, an acid anhydride, or an amine compound besides the imidazole derivative and the epoxy compound mentioned above.

In this curable composition, the imidazole derivative, when exposed to the light as mentioned above, liberates imidazole. Following this the liberated imidazole functions as a catalyst as for the addition reaction of the aforementioned compound to the epoxy compound. Consequently, when the composition is subsequently cured by means of heat, a cured product exhibiting excellent characteristics is obtained.

Examples of the polyfunctional phenol compounds to be used in the present invention include, but are not limited to: 4,4',4''-methylidene trisphenol, bisphenol A, bisphenol F, bisphenol S, phenolic resin, and cresol resin.

Examples of the polyfunctional carboxylic acids include, but are not limited to: oxalic acid, malonic acid, succinic acid, glutaric acid, adipic acid, sebacic acid, maleic acid, fumaric acid, iraconic acid, muconic acid, phthalic acid, hexahydrophthalic acid, 3-methylhexahydrophthalic acid, 4-methylhexahydrophthalic acid, 3-ethylhexahydrophthalic acid, 4-ethylhexahydrophthalic acid, tetrahydrophthalic acid, 3-methyltetrahydrophthalic acid, 4-methyltetrahydrophthalic acid, 3-ethyltetrahydrophthalic acid, 4-ethyltetrahydrophthalic acid, and trimellitic acid.

Typical examples of the acid anhydrides include, but are not limited to: dibasic acid anhydrides such as maleic anhydride, succinic anhydride, itaconic anhydride, phthalic anhydride, tetrahydrophtalic anhydride, hexahydrophthalic anhydride, methylhexahydrophthalic anhydride, endomethylenetetrahydrophthalic anhydride, methylendomethylenetetrahydrophthalic anhydride, chlorendic anhydride, and methyltetrahydrophthalic anhydride; aromatic polycarboxylic anhydrides such as trimellitic anhydride, pyromellitic anhydride, and benzophenone-tetracarboxylic dianhydride; and polycarboxylic anhydride derivatives such as 5-(2,5-dioxotetrahydrofuryl)-3-methyl-3-cyclohexene-1,2-dicarboxlic anhydride.

Examples of the amine compounds include, but are not limited to: 4,4',4"-triaminotriphenyl methane, 4,4',4"-triaminotriphenyl ethane, 4,4'-diaminodiphenyl methane, 4,4'-diaminodiphenyl sulfone, o-, m-, or p-phenylenediamine, boron trifluoride-amine complex, dicyandiamide and derivatives thereof, organic acid hydrazide, diaminomaleonitrile, melamine and derivatives thereof, imido amine, and salts of polyamines.

The polyfunctional phenol compound, carboxylic acid, acid anhydride, and amine compound mentioned above may be used either singly or in the form of a mixture of two or more members. They are theoretically added in such amounts that a phenol group, a carboxyl group, or an amino group may be contained in equimolar amounts per mol of the epoxy group of the epoxy compound which is simultaneously added. Generally, they are added in an amount in the range of 0.1 to 1.3 mols, preferably 0.3 to 1.1 mols.

Even in the curable composition which comprises an imidazole derivative, an epoxy compound, and such polyfunctional phenol compound, carboxylic acid, acid anhydride, or amine compound as mentioned above, the amount of the imidazole derivative to be added, the method for preparing the composition, the light source for irradiation, the duration of the irradiation, and the heating temperature are similar to those which are applicable to the curable composition comprising an imidazole derivative and an epoxy compound. Thus, the curable composition is capable of producing a cured product excelling in various characteristics.

The curable composition of the present invention may further incorporate therein, as occasion demands, a well-known conventional filler such as barium sulfate, silicon oxide, talc, clay or calcium carbonate; a well-known conventional color pigment such as phthalocyanine blue, phthalocyanine green, titanium dioxide, or carbon black; an anti-foaming agent; an adhesiveness-imparting agent; a leveling agent, or some other additives, to such an extent that the addition thereof brings about practically no problem in terms of the photocuring reaction and the thermal curing reaction mentioned above.

The epoxy resin-based curable composition according to the present invention utilizes an imidazole derivative of the general formula (1) having the amino group of the imidazole thereof in a blocked state as a catalyst as for the ring opening polymerization of an epoxy group or for the addition reaction of an epoxy group to a polyfunctional phenol compound, carboxylic acid, acid anhydride, or amine compound. It, therefore, never promotes a curing reaction unless it is exposed to light and, when preserved in a dark place, exhibits outstanding storage stability. For the purpose of use, the composition is exposed to light and, as a result, the imidazole derivative liberates imidazole, the liberated imidazole functions as a catalyst as for the ring opening polymerization of an epoxy group and for the addition reaction of the aforementioned compound to the epoxy compound and, when subsequently heated, promotes a curing reaction, and helps the cured composition to produce a cured product which excels in various characterstics. Further, since the curable composition of the present invention is cured by a thermal curing reaction, it never encounters the problem of poor surface curing properties due to the inhibition of polymerization by oxygen as is experienced by a (meth)acrylic ester-based photocured product.

The present invention will be illustrated in more detail by the following examples.

Synthetic Example 1

Synthesis of N-(2-nitrobenzyloxy)carbonyl imidazole (hereinafter referred to briefly as "2NBCI"):

In 150 ml of acetonitrile, 11.35 g (70 millimoles) of N,N'-carbonyl diimidazole and 10.72 g (70 millimoles) of 2-nitrobenzyl alcohol were dissolved and left reacting at room temperature for 24 hours. The resultant reaction mixture was distilled under a reduced pressure to expel the solvent by evaporation. Then, the residue of the distillation was recrystallized from ethyl acetate to obtain 12.86 g (yield 74%) of the captioned product (2NBCI) having a melting point of 143°–144° C.

IR spectrum and $^1$H-NMR spectrum of this product were as shown below.

IR spectrum (KBr): 1751 cm$^{-1}$ (C=O), 1523 and 1342 cm$^{-1}$ (NO$_2$), 1179 and 1048 cm$^{-1}$ (C—O—C)

$^1$H-NMR spectrum (200 MHz, solvent CDCl$_3$, inner standard TMS):

δ (ppm) =   5.83(s, 2.0H, —CH$_2$—)
            7.10(s, 1.0H, cyclic CH)
            7.46(s, 1.0H, cyclic CH)
            7.55–7.82(m, 3.0H, aromatic H)
            8.13–8.25(m, 2.0H, aromatic H, N=CH)

Elemental analysis of the product:

Calculated as C$_{11}$H$_9$N$_3$O$_4$: C; 53.45%, H; 3.67%, N; 17.00%

Found: C; 53.33%, H; 3.50%, N; 17.16%

The results of analysis shown above clearly indicate production of 2NBCI. By the differential thermal analysis, the product was found to have a decomposition temperature of 200° C.

Synthetic Example 2

Synthesis of N-(3-nitrobenzyloxy)carbonyl imidazole (hereinafter referred to briefly as "3NBCI"):

To a solution of 0.973 g (6 millimoles) of N,N'-carbonyl diimidazole in 15 ml of acetonitrile, a solution of 0.766 g (5 millimoles) of 3-nitrobenzyl alcohol in 5 ml of acetonitrile was added dropwise at room temperature over a period of one hour. The resultant mixture was stirred at room temperature for 4 hours. After the reaction, the solution consequently obtained was concentrated under a reduced pressure and then extracted five times with chloroform-water. The extracted chloroform layer was further dehydrated with magnesium sulfate and distilled under a reduced pressure to expel chloroform by evaporation. The solid consequently obtained was recrystallized once from ethyl acetate to obtain 0.964 g (yield 78%) of the captioned product (3NBCI) having a melting point of 106.0°–107.3° C.

IR spectrum and $^1$H-NMR spectrum of this product were as shown below.

IR spectrum (KBr): 1770 cm$^{-1}$ (C=O), 1528 and 1346 cm$^{-1}$ (NO$_2$), 1181 and 1061 cm$^{-1}$ (C—O—C)

H-NMR spectrum (200 MHz, CDCl$_3$, TMS):

| | |
|---|---|
| δ (ppm) = | 5.5(s, 2.0H, —CH$_2$—) |
| | 7.1(s, 1.0H, cyclic CH) |
| | 7.4–7.5(m, 1.0H, cyclic CH) |
| | 7.6(t, 1.0H, aromatic H) |
| | 7.8(d, 1.0H, aromatic H) |
| | 8.1(S, 1.0H, N=CH) |
| | 8.2–8.4(m, 1.9H, aromatic H) |

Elemental analysis of the product:

Calculated as C$_{11}$H$_9$N$_3$O$_4$: C; 53.45%, H; 3.67%, N; 17.00%

Found: C; 53.77%, H; 3.74%, N; 17.06%

Synthetic Example 3

Synthesis of N-(4-nitrobenzyloxy)carbonyl imidazole (hereinafter referred to briefly as "4NBCI"):

To a solution of 0.811 g (5 millimoles) of N,N'-carbonyl diimidazole in 15 ml of acetonitrile, 0.766 g (5 millimoles) of 4-nitrobenzyl alcohol was added. The resultant mixture was stirred at room temperature for 24 hours. After the reaction, the solution consequently obtained was concentrated under a reduced pressure and then extracted three times with chloroform-water. The extracted chloroform layer was further dehydrated with magnesium sulfate and distilled under a reduced pressure to expel chloroform by evaporation. The solid consequently obtained was recrystallized once from ethyl acetate to obtain 0.911 g (yield 73.7%) of the captioned product (4NBCI) having a melting point of 127.8°–128.5° C.

IR spectrum and $^1$H-NMR spectrum of this product were as shown below.

IR spectrum (KBr) : 1756 cm$^{-1}$ (C=O), 1512 and 1350 cm$^{-1}$ (NO$_2$), 1181 and 1056 cm$^{-1}$ (C—O—C)

$^1$H-NMR spectrum (200 MHz, CDCl$_3$, TMS):

| | |
|---|---|
| δ (ppm) = | 5.5(s, 2.0H, —CH$_2$—) |
| | 7.1(s, 1.0H, cyclic CH) |
| | 7.4–7.5(m, 1.0H, cyclic CH) |
| | 7.6(d, 1.0H, aromatic H) |
| | 8.1(s, 1.0H, N=CH) |
| | 8.3(d, 2.0H, aromatic H) |

Elemental analysis of the product:

Calculated as C$_{11}$H$_9$N$_3$O$_4$: C; 53.45%, H; 3.67%, N; 17.00%

Found: C; 53.16%, H; 3.64%, N; 17.23%

Synthetic Example 4

Synthesis of N-[4-chloro-(2-nitrobenzyloxy)]carbonyl imidazole (hereinafter referred to briefly as "CNBCI"):

A solution of 0.811 g (5 millimoles) of N,N'-carbonyl diimidazole in 10 ml of acetonitrile and 0.938 g (5 millimoles) of 4-chloro-2-nitrobenzyl alcohol subsequently added thereto were stirred at room temperature for 24 hours. After the cooling of the mixture with ice, the precipitated product was separated by filtration. The product, thus separated, was recrystallized once from ethyl acetate to obtain the captioned product. The filtrate was further concentrated at room temperature under a reduced pressure and extracted three times with chloroform-water. The extracted chloroform layer was dehydrated with magnesium sulfate and then distilled under a reduced pressure to expel the solvent by evaporation. The solid consequently obtained was recrystallized once from ethyl acetate to obtain 1.117 g (yield 79.3%) of the captioned product (CNBCI). This product was found to have a melting point of 139.5°–141.2° C.

IR spectrum and $^1$H-NMR spectrum of this product were as shown below.

IR spectrum (KBr): 1762 cm$^{-1}$ (C=O), 1525 and 1362 cm$^{-1}$ (NO$_2$), 1181 and 1096 cm$^{-1}$ (C—O—C)

$^1$H-NMR spectrum (200 MHz, CDCl$_3$, TMS):

| | |
|---|---|
| δ (ppm) = | 5.8(s, 2.0H, —CH$_2$—) |
| | 7.1(s, 1.0H, cyclic CH) |
| | 7.4–7.5(m, 1.0H, cyclic CH) |
| | 7.5–7.8(m, 2.0H, aromatic H) |
| | 8.1–8.3(m, 2.0H, aromatic H, N=CH) |

Elemental analysis of the product:

Calculated as C$_{11}$H$_8$N$_3$O$_4$Cl: C; 46.91%, H; 2.86%, N; 14.92%

Found: C; 47.08%, H; 2.81%, N; 14.90%

Synthetic Example 5

Synthesis of N-5-methyl-2-nitrobenzyloxycarbonyl imidazole (hereinafter referred to briefly as "5MNBCI"):

To a solution of 0.973 g (6 millimoles) of N,N'-carbonyl diimidazole in 15 ml of tetrahydrofuran, 0.836 g (5 millimoles) of 5-methyl-2-nitrobenzyl alcohol in 10 ml of tetrahydrofuran was added dropwise at room temperature over a period of 30 minutes. The resultant mixture was stirred at room temperature for 24 hours. After the reaction, the solution consequently obtained was concentrated under a reduced pressure and then extracted five times with chloroform-water. The extracted chloroform layer was further dehydrated with magnesium sulfate and distilled under a reduced pressure to expel chloroform by evaporation. 1.233 g (yield 94.4%) of the captioned product (5MNBCI) having a melting point of 80.7°–81.6° C. was obtained.

IR spectrum and $^1$H-NMR spectrum of this product were as shown below.

IR spectrum (KBr): 1762 cm$^{-1}$ (C=O), 1514 and 1336. cm$^{-1}$ (NO$_2$), 1175 and 1059 cm$^{-1}$ (C—O—C)

$^1$H-NMR spectrum (200 MHz, CDCl$_3$, TMS):

| | |
|---|---|
| δ (ppm) = | 2.5(s, 3.0H, —CH$_3$) |
| | 5.8(s, 2.0H, —CH$_2$—) |
| | 7.1(s, 0.9H, cyclic CH) |
| | 7.3–7.6(m, 3.1H, cyclic CH, aromatic H) |
| | 8.1–8.2(m, 1.8H, N=CH, aromatic H) |

Synthetic Example 6

Synthesis of N-4,5-dimethoxy-2-nitrobenzyloxycarbonyl imidazole (hereinafter referred to briefly as "DMNBCI"):

To a solution of 0.973 g (6 millimoles) of N,N'-carbonyl diimidazole in 25 ml of tetrahydrofuran, a solution of 0.639 g (3 millimoles) of 4,5-dimethoxy-2-nitrobenzyl alcohol in 15 ml of tetrahydrofuran was added dropwise at 0° C. over a period of 30 minutes. The resultant mixture was stirred at 0° C. for 6 hours. The precipitated product was separated by filtration. The product, thus separated, was recrystallized once from ethyl acetate to obtain the captioned product. The filtrate was further concentrated at room temperature under a reduced pressure and extracted five times with chloroform-water. The extracted chloroform layer was dehydrated with magnesium sulfate and then distilled under a reduced pressure to expel the solvent by evaporation. The solid consequently obtained was recrystallized twice from ethyl acetate to obtain 0.664 g (yield 72.0%) of the captioned product (DMNBCI). This product was found to have a melting point of 135.0°–137.0° C.

IR spectrum and $^1$H-NMR spectrum of this product were as shown below.

IR spectrum (KBr): 1766 cm$^{-1}$ (C=O), 1525 and 1332 cm$^{-1}$ (NO$_2$), 1178 and 1065 cm$^{-1}$ (C—O—C)

$^1$H-NMR spectrum (200 MHz, CDCl$_3$, TMS):

| | |
|---|---|
| δ (ppm) = | 4.0(s, 6.1H, CH$_3$O) |
| | 5.8(s, 2.0H, —CH$_2$—) |
| | 7.0(s, 1.0H, cyclic CH) |
| | 7.1(s, 1.0H, cyclic CH) |
| | 7.5(s, 0.9H, cyclic CH) |
| | 7.8(s, 1.0H, aromatic H) |
| | 8.2(s, 0.9H, N=CH) |

EXAMPLE 1

A composition was prepared by dissolving 4.9 g (20 millimoles) of 2NBCI obtained in Synthetic Example 1 in 3.8 g (20 millimoles as epoxy group) of a bisphenol A type epoxy resin (product of Yuka Shell Epoxy K.K., EPIKOTE® 828, epoxy equivalent; 190). This composition was applied to a KBr plate and irradiated with the light from an ultra-high pressure mercury vapor lamp of 250 W for 70 minutes (10.80 mW/cm$^2$, 310 nm). The coating of the composition was tested for the degree of conversion of 2NBCI by the use of an infrared spectrophotometer. Based on the rate of decrease in the absorption at 1340 cm$^{-1}$ determined by this analysis, it was found that the composition generated about 70 mol % of free imidazole. When the irradiated coating was left standing at rest, the epoxy group of the epoxy resin was caused to undergo a ring opening reaction by the catalytic activity of the liberated imidazole even at room temperature. After 3 days of the standing, the coating was cured by crosslinkage. When the same composition was treated by following the procedure described above while omitting the irradiation of light, no curing reaction occurred. This fact implies that the composition manifested excellent storage stability in the absence of irradiation of light.

EXAMPLE 2

A composition was prepared by dissolving 0.49 g (2 millimoles) of 2NBCI obtained in Synthetic Example 1 in 3.8 g (20 millimoles as epoxy group) of the epoxy resin (EPIKOTE® 828). This composition was applied to a KBr plate and irradiated with the light from an ultra-high pressure mercury vapor lamp of 250 W for 60 minutes and 90 minutes in separate runs of test (10.80 mW/cm$^2$, 310 nm). The coating of composition was heated at 120° C. and tested for the degree of conversion of the epoxy group by the use of an infrared spectrophotometer.

COMPARATIVE EXAMPLE 1

A solution of 0.14 g (2 millimoles) of imidazole in 3.8 g (20 millimoles as epoxy group) of the epoxy resin (EPIKOTE® 828) was heated at 120° C. and tested for the degree of conversion of the epoxy group in the same manner as in Example 2.

The degrees of conversion of epoxy group determined by the infrared absorption spectral analysis in Example 2 and Comparative Example 1 are shown in FIG. 1. It is clearly noted from the results that the imidazole liberated from 2NBCI by the irradiation of light promoted the ring opening polymerization of the epoxy group.

The compositions on the KBr plate, after 120 minutes of heating, invariably allowed smooth advance of a curing reaction and ultimately formed insoluble cured films.

EXAMPLE 3

A composition was prepared by dissolving 0.25 g (1.0 millimole) of 2NBCI obtained in Synthetic Example 1 in 1.8 g (10 millimoles as epoxy group) of a phenol novolak type epoxy resin (product of Dow Chemical Company, D.E.N® 438, epoxy equivalent; 181). This composition was applied to a KBr plate, irradiated with the light from an ultra-high pressure mercury vapor lamp of 250 W for 60 minutes (10.80 mW/cm$^2$, 310 nm), subsequently heated at 120° C. for 120 minutes, and tested for the degree of conversion of the epoxy group by the use of an infrared spectrophotometer. It was consequently confirmed that of the epoxy group had undergone a reaction. This fact implies that the imidazole liberated from 2NBCI by the irradiation of light promoted the ring opening polymerization of the epoxy group.

Further, the compositions on the KBr plate, after 120 minutes of heating, allowed smooth advance of a curing reaction and ultimately formed insoluble cured films.

EXAMPLE 4

A composition was prepared by adding 0.30 g (1.2 millimoles) of 2NBCI and 1.17. g (1.2 millimoles as phenol group) of trifunctional phenol compound; 4,4',4"-methylidenetriphenol to 2.3 g (12 millimoles as epoxy group) of the epoxy resin (EPIKOTE® 828). This composition was applied to a KBr plate, irradiated with the light from an ultra-high pressure mercury vapor lamp of 250 W for 60 minutes (10.80 mW/cm$^2$, 310 nm), further heated at 120° C. for 90 minutes, and tested for the degree of conversion of the epoxy group by the use of an infrared spectrophotometer. It was consequently confirmed that 99% of the epoxy group had undergone a reaction. In the infrared absorption spectrum, a strong absorption caused by a hydroxyl group was found at 3400 cm$^{-1}$. This fact implies that the imidazole liberated from the 2NBCI by the irradiation of light promoted the addition reaction of the epoxy group to the phenol compound. Further, the composition, after 90 minutes of heating, allowed smooth advance of a curing reaction and ultimately formed an insoluble cured film.

EXAMPLE 5

A composition was prepared by dissolving 0.555 g (2.5 millimoles as epoxy group) of a glycidyl methacrylate (50 mol %)-methyl methacrylate (50 mol %) copolymer P (GMA$_{50}$—$_{co}$—MMA$_{50}$, epoxy equivalent; 222) and 0.062 g (0.25 millimole) of 2NBCI obtained in Synthetic Example 1 in 5 ml of tetrahydrofuran. This composition was applied to a KBr plate, left drying, then irradiated with the light from an ultra-high pressure mercury vapor lamp of 250 W for 60 minutes (10.80 mW/cm², 310 nm), subsequently heated at 140° C. for 60 minutes, and tested for the degree of conversion of the epoxy group by the use of an infrared spectrophotometer. It was consequently confirmed that 55% of the epoxy group had undergone a reaction. This fact implies that the imidazole liberated from the 2NBCI by the irradiation of light promoted the ring opening polymerization of the epoxy group.

Further, the composition, after 90 minutes of heating, allowed smooth advance of a crosslinking reaction and ultimately formed an insoluble film.

EXAMPLE 6

A composition was prepared by adding 0.49 g (2 millimoles) of 2NBCI and 2.96 g (20 millimoles) of phthalic anhydride to 3.8 g (20 millimoles as epoxy group) of the epoxy resin (EPIKOTE® 828). This composition was applied to a KBr plate, irradiated with the light from an ultra-high pressure mercury vapor lamp of 250 W for 60 minutes (10.80 mW/cm², 310 nm), further heated at 120° C. for 120 minutes, and tested for the degree of conversion of the epoxy group by the use of an infrared spectrophotometer. It was consequently confirmed that 99% of the epoxy group had undergone a reaction. In the infrared absorption spectrum, a strong absorption caused by an ester linkage was found at 1730 cm⁻¹. This fact implies that the imidazole liberated from the 2NBCI by the irradiation of light promoted the ring opening copolymerization of the epoxy group and the carboxylic acid anhydride. The composition, after the irradiation of light and the heating, allowed smooth advance of a curing reaction and ultimately formed an insoluble cured film.

EXAMPLE 7

A composition was prepared by adding 0.49 g (2 millimoles) of 2NBCI and 1.92 g (10 millimoles as carboxyl group and 10 millimoles as acid anhydride group) of trimellitic anhydride to 3.8 g (20 millimoles as epoxy group) of the epoxy resin (EPIKOTE® 828). This composition was applied to a KBr plate, irradiated with the light from an ultra-high pressure mercury vapor lamp of 250 W for 60 minutes (10.80 mW/cm², 310 nm), further heated at 120° C. for 120 minutes, and tested for the degree of conversion of the epoxy group by the use of an infrared spectrophotometer. It was consequently confirmed that 89% of the epoxy group had undergone a reaction. In the infrared absorption spectrum, strong absorptions caused by a hydroxyl group and an ester linkage were found respectively at 3400 cm⁻¹ and 1740 cm⁻¹. This fact implies that the imidazole liberated from the 2NBCI by the irradiation of light promoted the addition reaction of the epoxy group to the carboxylic acid and the ring opening copolymerization of the epoxy group and the acid anhydride group. The composition, after the irradiation of light and the heating, allowed smooth advance of a curing reaction and ultimately formed an insoluble cured film.

EXAMPLE 8

A composition was prepared by adding 0.49 g (2 millimoles) of 2NBCI and 1.46 g (20 millimoles) of adipic acid to 3.8 g (20 millimoles as epoxy group) of the epoxy resin (EPIKOTE® 828). This composition was applied to a KBr plate, irradiated with the light from an ultra-high pressure mercury vapor lamp of 250 W for 60 minutes (10.80 mW/cm², 310 nm), further heated at 120° C. for 120 minutes, and tested for the degree of conversion of the epoxy group by the use of an infrared spectrophotometer. It was consequently confirmed that 95% of the epoxy group had undergone a reaction. In the infrared absorption spectrum, strong absorptions caused by a hydroxyl group and an ester group were found respectively at 3400 cm⁻¹ and 1740 cm⁻¹. This fact implies that the imidazole liberated from the 2NBCI by the irradiation of light promoted the addition reaction of the epoxy group to the adipic acid. The composition, after the irradiation of light and the heating, allowed smooth advance of a curing reaction and ultimately formed an insoluble cured film.

While certain specific working examples have been disclosed herein, the invention may be embodied in other specific forms without departing from the spirit or essential characteristics thereof. The described example are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A curable composition comprising:
   (A) an imidazole derivative represented by the following general formula (1), which is capable of generating free imidazole by irradiation with a light, and
   (B) a polyfunctional epoxy compound:

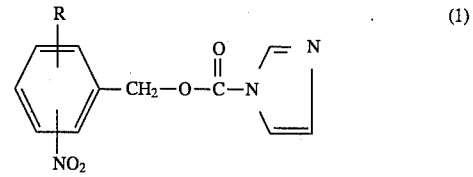

wherein R represents a hydrogen atom, a halogen atom, an alkyl group, an aryl group, an aralkyl group, a nitro group, a cyano group, an alkoxyl group, a phenoxy group, or an aromatic ring residue capable of forming a condensed ring in combination with a benzene ring.

2. The composition according to claim 1, wherein said imidazole derivative is at least one member selected from the group consisting of the following compounds (a) through (m):

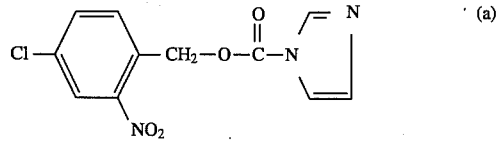

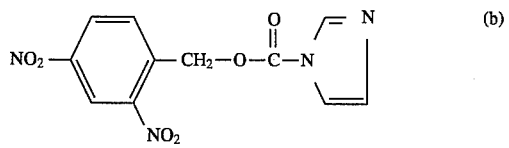

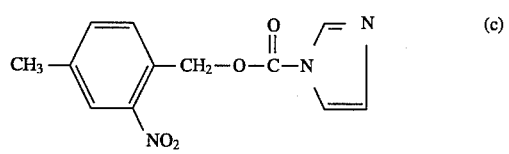

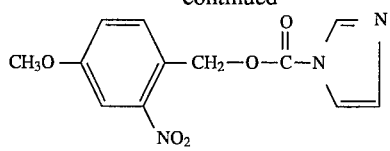
(d)

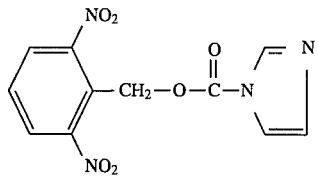
(e)

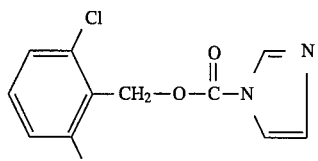
(f)

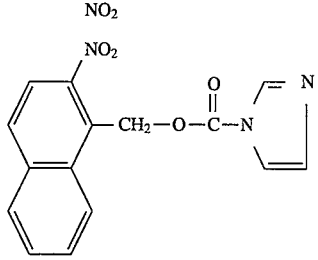
(g)

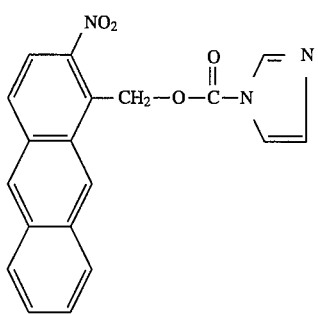
(h)

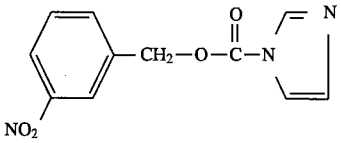
(i)

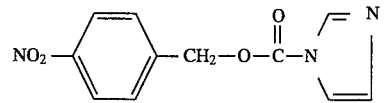
(j)

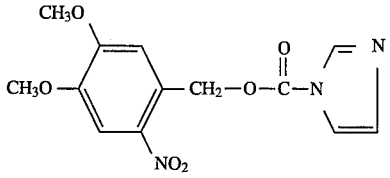
(k)

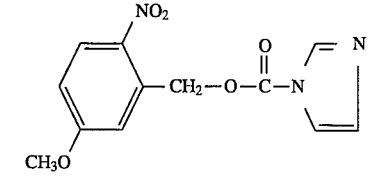
(l)

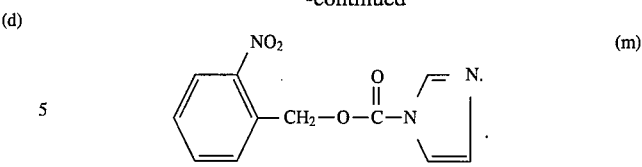
(m)

3. The composition according to claim 1, wherein said epoxy compound is at least one member selected from the group consisting of glycidyl ethers of bisphenol A or brominated bisphenol A, glycidyl ethers of novolak resins, glycidyl ethers of bisphenol F, glycidyl ethers of bisphenol S, alicyclic epoxy resins, glycidyl ester resins, glycidyl derivatives of amines, epoxy resins having glycidyl groups linked to a hydantoin ring, triglycidyl isocyanurate, glycidyl ethers of bixylenols, glycidyl ethers of biphenols, and (meth-)acrylic copolymers having glycidyl groups in their side chains.

4. The composition according to claim 1, wherein said imidazole derivative is present in an amount of 0.1 to 30 mol % per one mol of epoxy group of said epoxy compound.

5. The composition according to claim 1, which further comprises an inorganic filler, a color pigment, an antifoaming agent, an adhesiveness-imparting agent, or a leveling agent.

6. A curable composition comprising:
(A) an imidazole derivative represented by the following general formula (1), which is capable of generating free imidazole by irradiation with a light,
(B) a polyfunctional epoxy compound, and
(C) at least one compound selected from the group consisting of polyfunctional phenol compounds, polyfunctional carboxylic acids, acid anhydrides, and amine compounds:

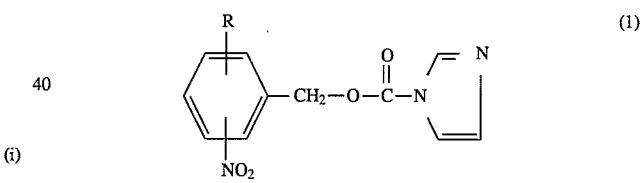
(1)

wherein R represents a hydrogen atom, a halogen atom, an alkyl group, an aryl group, an aralkyl group, a nitro group, a cyano group, an alkoxyl group, a phenoxy group, or an aromatic ring residue capable of forming a condensed ring in combination with a benzene ring.

7. The composition according to claim 6, wherein said imidazole derivative is at least one member selected from the group consisting of the following compounds (a) through (m):

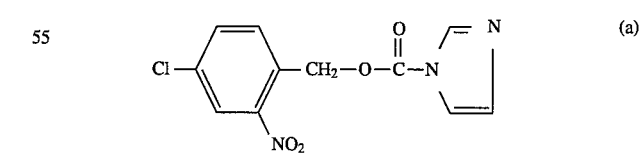
(a)

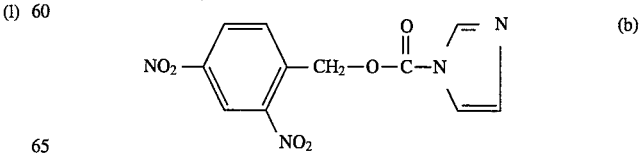
(b)

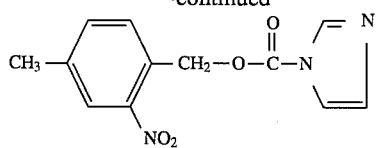

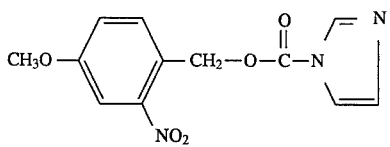

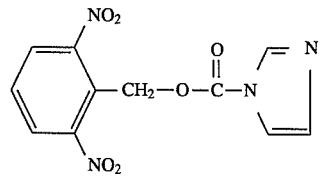

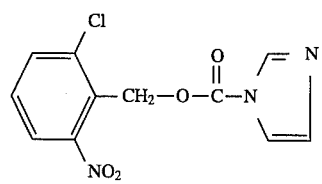

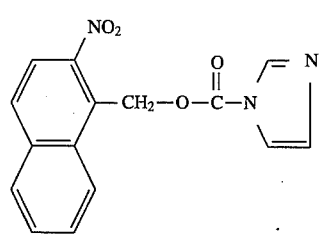

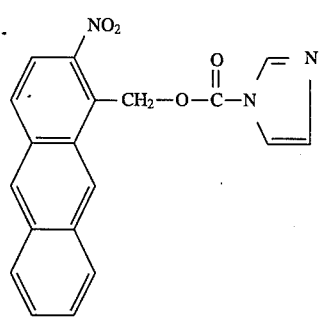

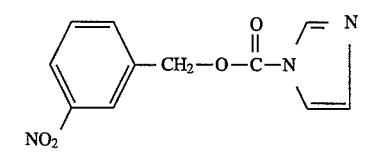

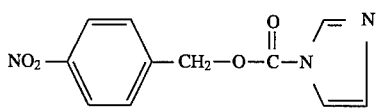

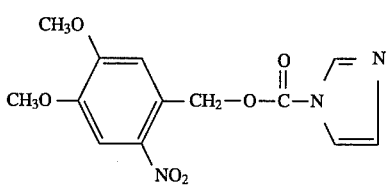

(c)

(d)

(e)

(f)

(g)

(h)

(i)

(j)

(k)

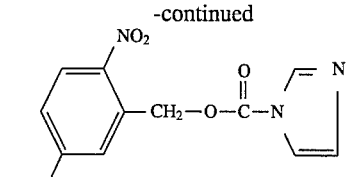

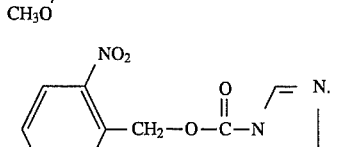

(l)

(m)

8. The composition according to claim 6, wherein said epoxy compound is at least one member selected from the group consisting of glycidyl ethers of bisphenol A or brominated bisphenol A, glycidyl ethers of novolak resins, glycidyl ethers of bisphenol F, glycidyl ethers of bisphenol S, alicyclic epoxy resins, glycidyl ester resins, glycidyl derivatives of amines, epoxy resins having glycidyl groups linked to a hydantoin ring, triglycidyl isocyanurate, glycidyl ethers of bixylenols, glycidyl ethers of biphenols, and (meth-)acrylic copolymers having glycidyl groups in their side chains.

9. The composition according to claim 6, wherein said polyfunctional phenol compound is at least one member selected from the group consisting of 4,4',4"-methylidene trisphenol, bisphenol A, bisphenol F, bisphenol S, phenolic resin, and cresol resin.

10. The composition according to claim 6, wherein said polyfunctional carboxylic acid is at least one member selected from the group consisting of oxalic acid, malonic acid, succinic acid, glutaric acid, adipic acid, sebacic acid, maleic acid, fumaric acid, iraconic acid, muconic acid, phthalic acid, hexahydrophthalic acid, 3-methylhexahydrophthalic acid, 4-methylhexahydrophthalic acid, 3-ethylhexahydrophthalic acid, 4-ethylhexahydrophthalic acid, tetrahydrophthalic acid, 3-methyltetrahydrophthalic acid, 4-methyltetrahydrophthalic acid, 3-ethyltetrahydrophthalic acid, 4-ethyltetrahydrophthalic acid, and trimellitic acid.

11. The composition according to claim 6, wherein said acid anhydride is at least one member selected from the group consisting of maleic anhydride, succinic anhydride, itaconic anhydride, phthalic anhydride, tetrahydrophtalic anhydride, hexahydrophthalic anhydride, methylhexahydrophthalic anhydride, endomethylene-tetrahydrophthalic anhydride, methylendomethylenetetrahydrophthalic anhydride, chlorendic anhydride, methyltetrahydrophthalic anhydride, trimellitic anhydride, pyromellitic anhydride, benzophenone-tetracarboxylic dianhydride, and 5-(2,5-dioxotetrahydrofuryl)-3-methyl-3-cyclohexene-1,2-dicarboxylic anhydride.

12. The composition according to claim 6, wherein said amine compound is at least one member selected from the group consisting of 4,4',4"-triaminotriphenyl methane, 4,4',4"-triaminotriphenyl ethane, 4,4'-diaminodiphenyl methane, 4,4'-diaminodiphenyl sulfone, o-, m-, or p-phenylenediamine, boron trifluoride-amine complex, dicyandiamide and derivatives thereof, organic acid hydrazide, diaminomaleonitrile, melamine and derivatives thereof, an imido amine, and salts of polyamines.

13. The composition according to claim 6, wherein said imidazole derivative is present in an amount of 0.1 to 30 mol % per one mol of epoxy group of said epoxy compound.

14. The composition according to claim 6, which contains said polyfunctional phenol compound in an amount of 0.1 to 1.3 mols per one mol of epoxy group of said epoxy compound.

15. The composition according to claim 6, which contains said polyfunctional carboxylic acid in an amount of 0.1 to 1.3 mols per one mol of epoxy group of said epoxy compound.

16. The composition according to claim 6, which contains said acid anhydride in an amount of 0.1 to 1.3 mols per one mol of epoxy group of said epoxy compound.

17. The composition according to claim 6, which contains said amine compound in an amount of 0.1 to 1.3 mols per one mol of epoxy group of said epoxy compound.

18. The composition according to claim 6, which further comprises an inorganic filler, a color pigment, an antifoaming agent, an adhesiveness-imparting agent, or a leveling agent.

* * * * *

UNITED STATES PATENT AND TRADEMARK OFFICE
CERTIFICATE OF CORRECTION

PATENT NO. : 5,623,023
DATED      : April 22, 1997
INVENTOR(S) : Tadatomi Nishikubo It is certified that error appears in the above-indentified patent and that said Letters Patent is hereby corrected as shown below:

On the title page: Item

-- [73] Assignee:  Taiyo Ink Manufacturing Co., Ltd., JAPAN
                   Tadatomi Nishikubo, JAPAN --

Signed and Sealed this

Sixteenth Day of September, 1997

Attest:

BRUCE LEHMAN

*Attesting Officer*         *Commissioner of Patents and Trademarks*